Dec. 28, 1965  B. FROOT  3,225,749
FLUID HEATER ORGANIZATION WITH
IMPROVED FLOW CONTROL MEANS
Filed Dec. 23, 1963
FIG_1
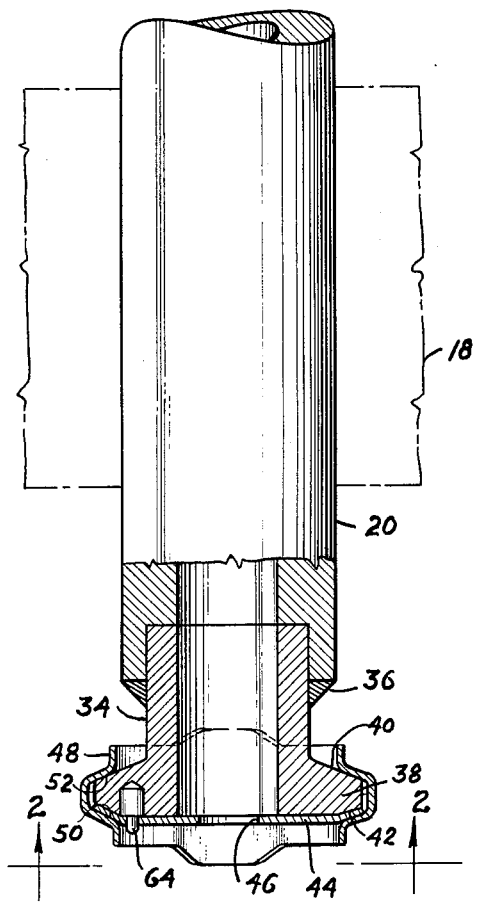
FIG_4
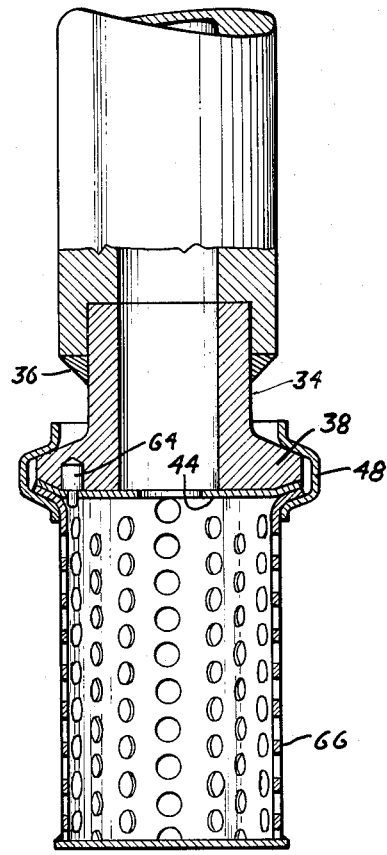
FIG_2
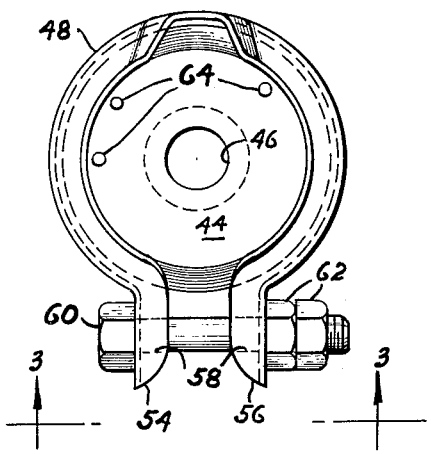
FIG_3
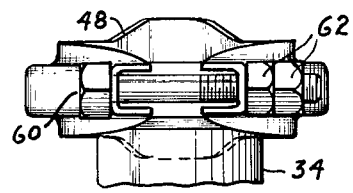

United States Patent Office 3,225,749
Patented Dec. 28, 1965

3,225,749
FLUID HEATER ORGANIZATION WITH
IMPROVED FLOW CONTROL MEANS
Bernard Froot, West Hartford, Conn., assignor to Combustion Engineering, Inc., Windsor, Conn., a corporation of Delaware
Filed Dec. 23, 1963, Ser. No. 332,751
7 Claims. (Cl. 122—406)

This invention relates generally to orifice assemblies for use with fluid heaters wherein a working fluid, such as water, is forced through tubular members with there being orifices or restrictors associated with these tubular members so as to regulate the flow through them as desired and necessary for proper operation of the fluid heater.

These fluid heaters to which the invention pertains have a large number of tubular members which must be provided with this flow regulating means. Since it is necessary to remove this flow regulator from the tubular member incident to certain maintenance procedures, it is desired that the restrictor or orifice assembly be such as to permit the orifice to be readily disconnected from the tubular member. Furthermore, since there are a large number of these orifice assemblies required in a typical installation, it is desired that they be economical to manufacture and easy to assemble and it is, of course, necessary that they perform satisfactorily over long periods of time. These objectives are realized with the present invention wherein the orifice is formed in a stamped orifice plate or disc which is a very thin member fabricated of stainless steel. This disc is secured in place at the inlet end of each of the tubular members by means of a circumferentially expandable clamp which is formed to be complementary with and snugly received by a flange that is formed on the inner end of the tubular member. The clamp has axially spaced tapered surfaces which receive therebetween the flange and the orifice disc that overlies the surface of the flange provided on the face of the tubular member. The expandable clamp is drawn together or contracted by means of a bolt that is received in aligned openings provided in outwardly extending ends that form part of the clamp. The clamp is also a stainless steel stamping so that it can be economically manufactured.

Since not all the tubular members have orifices of the same size, there is provided means for identifying the orifice plate of proper size with the particular tubular member for which it is intended. This means includes angularly spaced indexing pins that extend from the face of the tubular members and that are received within corresponding openings provided in the orifice disc. These indexing pins extend outwardly from the face of the tubular member a sufficient distance so that if the orifice disc does not have openings properly aligned for receiving these pins, the orifice disc will not fit upon the tubular member in a manner that will permit the clamp to be positioned in place and tightened. It will thus be apparent when there is a mismatch of an orifice disc with a particular tubular member, it will be impossible to secure an orifice disc to a tubular member.

Accordingly, it is an object of the present invention to provide an improved orifice assembly for use with tubular members.

A further object of the invention is to provide such an improved assembly which is relatively simple to manufacture and economical yet reliable in operation.

A still further object of the invention is to provide such an improved orifice assembly for regulating the flow through the tubular members which assembly permits the flow restricter to be readily removed from its association with the tubular member.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein:

FIGURE 1 is a detailed sectional view through a portion of a tubular member showing the orifice assembly of the invention associated therewith;

FIGURE 2 is an end elevational view taken generally from line 2—2 of FIGURE 1;

FIGURE 3 is a side view of the orifice assembly taken from line 3—3 of FIGURE 2; and FIGURE 4 is a view similar to that of FIGURE 1 but showing a modification wherein a conical strainer has been added to the orifice assembly.

The orifice assembly of this invention is utilized to control the flow through a tubular member such as that utilized in vapor generators with the assembly being particularly designed to provide an economic and simple arrangement whereby assurance will be provided that an assembly of a particular size will be utilized with a particular tubular member thereby eliminating a possibility of having an orifice of incorrect size associated with a particular tube. It will be appreciated that in relatively large vapor generators there will be a substantial number of orifices employed which are of varying sizes. In accordance with the preferred embodiment of the invention as illustratively shown in FIGURES 1, 2 and 3, there is provided at the inner region of the distribution tube 20 tubular member 34 which, in effect, is part of and forms the inner end of the tube 20. The reason for providing the separate member 34 is for ease of machining the flange that is a necessary part of this member. However, if desired this two piece construction may be eliminated and the flange machined directly on the end of the tube 20. As disclosed, the tubular member is received in a counter bore provided at the end of the tube 20 and is welded to the end of this tube 20 by the weld 36. There is formed at the outer end of tubular member 34 the flange 38 which extends radially outward and has its axially spaced surfaces 40 and 42 tapered outwardly toward each other.

Overlying the face of tubular member 34 is the orifice plate or disc 44 with this disc being dished so that the radially outer region or portion thereof overlies the surface 42 of the flange 38 and conforms therewith. This orifice disc 44 has provided generally centrally therein orifice 46 which communicates with the interior of the tubular member 34. This disc 34 is formed as a stamping and is a relatively thin member fabricated of stainless steel such as type 403.

The orifice plate 44 is maintained in assembled relationship in engagement with the face of member 34 by means of the circumferentially expandable clamp 48. This clamp is also a stamping formed of relatively thin stainless steel (such as type 403) and is of a configuration, as shown, so that it is provided with axially spaced surfaces 50 and 52 which are disposed generally complementary with the surfaces 40 and 42 of flange 38. This clamp 48 has outwardly extending end members or portions 54 and 56, as shown in FIGURE 3, and which are provided with openings 58 for receipt of the bolt 60. When the clamp is in the position depicted in FIGURES 2, 3 and 4, the flange 38 and the orifice disc 44 are snugly clamped between the surfaces 50 and 52 so that the orifice disc is retained in place in engagement with the face of tubular member 34. The nuts 62 threaded on the bolt 60 retain the clamp in its clamping position with the two nuts providing a locking function. When it is desired to remove the orifice disc 44 from overlying relation with the face of the tubular member 34 the nuts 62 are removed and the clamp 48 is circumferentially expanded and removed from its encompassing relation with the end of the tubular member. Thereafter the orifice disc may be readily removed from the tubular member 34.

In order to index the orifice plate carrying with the proper sized orifice with the tubular member for which it is designed, an indexing arrangement is provided. As illustratively disclosed, this includes the pin members 64 mounted in the members 34 and extending from the end face thereof. There are three such members shown in FIGURE 3 with these members being angularly spaced. Openings are provided in the orifice 44 for snugly receiving these members 64. It will thus be apparent that by varying the angularity or the angular disposition of the members 64 orifice discs having orifices of a particular size may be properly indexed with the tubular members for which they are intended whereby an orifice that is not the proper size for a particular tubular member cannot be clamped thereto. The angular position of the pin members 64 will be different for each different size of orifice that is employed. The pin members 64 extend a sufficient distance from the end face of the tubular member 34 so that if it is attempted to place the wrong orifice plate or disc over the end face of member 34, the pin members 64 which will not be properly indexed with the openings in the orifice plate will maintain and hold the orifice plate 44 spaced a sufficient distance from the end face of the tubular members so that it will be impossible to assemble the clamp 48. In such an instance, the disc 44 and flange 38 will not fit between the surfaces 50 and 52 of the clamp 48. The dished configuration of the orifice disc is such as to also make it impossible to place the clamp in position when the disc is placed upside down on the end of the tube member.

In addition to clamping the orifice plate to the end of tubular member 34, there may also be clamped a screen such as the cylindrical screen 66 shown in FIGURE 5. This screen is provided with a generally radially extending flange as shown which overlies the outer portion of the orifice plate 44 and with this arrangement, the screen is securely fastened in place with there being no extra parts whatever required and with the screen being effective to prevent clogging of the orifice 46 in installations where such is necessary and desirable.

While there has been illustrated and described a preferred embodiment of the invention, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. An orifice assembly for controlling flow in a tubular fluid heater comprising a tubular member provided at the extremity of one of its two ends with a radially outward extending flange having an outwardly narrowing transverse section, a disc member overlying the face of said one end in complementary relation therewith and having an orifice communicating with the interior of the tubular member, means releasably retaining the disc in place including a circumferentially expandable clamp means disposed about said flange and disc and having axially spaced surfaces snugly embracing the flange and disc, and mechanical indexing means for indexing the disc member having an orifice of particular size with the tubular member and effective unless properly indexed to retain the disc member spaced from the tubular member sufficiently to prevent receipt of the flange and disc intermediate the axially spaced surfaces of said clamp.

2. The organization of claim 1 wherein the indexing means comprises angularly spaced projections extending from one of said members and complementary recesses in the other member receiving said projections.

3. In combination a plurality of tubular members, flow regulating means at one end of said members and including a radially outward extending flange formed at said one end the axially spaced surfaces of which taper outwardly toward each other, a dished orifice plate overlying the face of the member in conforming relation therewith and having an orifice communicating with the interior of said member, the size of this orifice for some members being different than that for others, mechanical indexing means for indexing the orifice plate with the tubular members with this indexing means for each orifice size being unique, a circumferentially expandable clamp disposed about the flange and orifice plate and having axially spaced surfaces complementary with the axially spaced surfaces of the flange and embracing the flange and orifice plate therebetween, said mechanical indexing means being effective when improperly indexed, to retain the orifice plate spaced from the end of the tubular member sufficient to prevent assembling of the clamp about the plate and the flange.

4. The organizaiton of claim 3 wherein the orifice plate is dished sufficiently as to prevent receipt of the flange and plate intermediate axially spaced surfaces of the expandable clamp when the orifice plate is positioned upside down on the surface of the tubular member.

5. The organziation of claim 3 wherein the mechanical indexing means includes angularly spaced projections received in complementary recesses.

6. A plurality of tubular members through which fluid is conveyed from the inlet to the outlet, flow control means at the inlet of said members including an orifice disc complementary with and overlying the end face of said members and having an orifice communicating with the interior of said members, with the size of this orifice for some members being different than that for others, means for releasably securing said disc to the member including a circumferentially expandable clamp disposed about said inlet end in coaxial relation therewith and having outwardly extending end portions provided with aligned openings, a bolt member received within said openings and operative to contract said clamp in position about said inlet end, said clamp having axially spaced surfaces extending radially inward in diverging relation to each other, the inner end of said members being provided with an outwardly extending radial flange the axially spaced surfaces of which conform generally to those of the clamp with the orifice plate overlying the outer of said surfaces and dished so as to conform thereto, said clamp being contracted about the inner end of said members and snugly embracing the flange and orifice plate between the axially spaced surfaces of the clamp, mechanical indexing means for indexing the orifice plate with the tubular member with the indexing means for different sized orifices being unique, said indexing means retaining the orifice plate, when improperly indexed, in sufficiently spaced relation from the end of said member so as to prevent positioning of the clamp about said inner end.

7. The improvement comprising a tubular member having an orifice disc complementary with and overlying the face of one end of said member, said disc being provided with an orifice therein communicating with the interior of said member, means releasably securing said disc to the member including a circumferentially expandable clamp disposed about said one end in co-axial relation therewith and having outwardly extending end portions provided with aligned openings, a bolt member received within said openings and operative to contract said clamp in position about said end, said clamp having axially spaced surfaces extending radially inward in diverging relation to each other, said one end of said member being provided with an outwardly extending radial flange the axially spaced surfaces of which conform generally to those of the clamp with the orifice plate overlying the outer of said surfaces and being dished so as to conform thereto, a strainer member having a radially outward extending annular lip overlying the outer region of said orifice plate, said clamp being contracted about said one end of said member and snugly embracing the flange, orifice plate and strainer lip between the axially spaced surfaces of the clamp, mechanical indexing mean for indexing the orifice plate with the tubular member, said indexing means retaining the orifice plate, when improperly indexed, in sufficiently spaced relation from the end of said member so as to prevent positioning of the clamp about said end.

References Cited by the Examiner

UNITED STATES PATENTS

| | | | |
|---|---|---|---|
| 2,249,469 | 7/1941 | Gray et al. | 138—40 |
| 2,473,660 | 6/1949 | Parman | 138—40 |
| 2,541,205 | 2/1951 | Christophersen | 285—367 X |
| 2,578,831 | 12/1951 | Patterson | 122—406 |
| 2,615,434 | 10/1952 | Patterson et al. | 122—406 |
| 2,688,170 | 9/1954 | Blazer | 285—40 X |
| 2,694,385 | 11/1954 | Witzke et al. | 122—406 |

FREDERICK L. MATTESON, JR., *Primary Examiner.*

KENNETH W. SPRAGUE, ROBERT A. O'LEARY,
*Examiners.*